(12) United States Patent
Maruoka et al.

(10) Patent No.: US 10,067,037 B2
(45) Date of Patent: Sep. 4, 2018

(54) METHOD FOR MEASURING TREAD RADIUS OF TIRE, AND DEVICE FOR MEASURING TREAD RADIUS USED THEREFOR

(71) Applicant: SUMITOMO RUBBER INDUSTRIES, LTD., Kobe-shi, Hyogo (JP)

(72) Inventors: Kiyoto Maruoka, Kobe (JP); Satoshi Ito, Kobe (JP); Tsuyoshi Ito, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 50 days.

(21) Appl. No.: 15/123,868

(22) PCT Filed: Dec. 3, 2014

(86) PCT No.: PCT/JP2014/082033
§ 371 (c)(1),
(2) Date: Sep. 6, 2016

(87) PCT Pub. No.: WO2015/133027
PCT Pub. Date: Sep. 11, 2015

(65) Prior Publication Data
US 2017/0016805 A1 Jan. 19, 2017

(30) Foreign Application Priority Data

Mar. 7, 2014 (JP) ................................. 2014-045398

(51) Int. Cl.
*G01M 17/02* (2006.01)
*G01B 11/10* (2006.01)

(52) U.S. Cl.
CPC ......... *G01M 17/027* (2013.01); *G01B 11/105* (2013.01)

(58) Field of Classification Search
CPC ........................... G01M 17/027; G01B 11/105
See application file for complete search history.

(56) References Cited

U.S. PATENT DOCUMENTS

| 5,485,406 A | 1/1996 | Wada et al. |
| 2006/0272167 A1* | 12/2006 | Chien ...................... G01C 9/00 33/286 |

(Continued)

FOREIGN PATENT DOCUMENTS

| JP | 3-226615 A | 10/1991 |
| JP | 2006-153555 A | 6/2006 |

(Continued)

OTHER PUBLICATIONS

English Machine Translation of Fujiwara, JP 2008-281438 A, Nov. 20, 2008, Translated Dec. 2017.*

(Continued)

*Primary Examiner* — Lisa Caputo
*Assistant Examiner* — David Z Huang
(74) *Attorney, Agent, or Firm* — Birch, Stewart, Kolasch & Birch LLP

(57) ABSTRACT

To accurately measure a tread radius of a rotating tire. A method for measuring a tread radius has a tread radius measuring process which comprises a measurement step, an averaging step, and a calculation step. In the measurement step, the radial distances from three laser displacement meters to the tread surface of the rotating tire are measured to obtain radial distance data y1, y2, y3 whose number is m per the entire circumference of the tire. In the averaging step, an averaged value y1N, y2N, y3N is obtained by averaging the remaining radial distance data from which noise data have been removed by performing a smoothing process on the number m of the radial distance data y1, y2, y3. In the calculation step, a tread radius TR is calculated from the averaged values y1N, y2N, y3N and the distances x1, x2, x3

(Continued)

of the laser displacement meters in the axial direction of the tire.

9 Claims, 7 Drawing Sheets

(56) References Cited

U.S. PATENT DOCUMENTS

| | | |
|---|---|---|
| 2007/0084541 A1 | 4/2007 | Moriguchi et al. |
| 2007/0295071 A1 | 12/2007 | Iwase et al. |
| 2013/0090879 A1* | 4/2013 | Estor .................... G01M 17/02 702/97 |

FOREIGN PATENT DOCUMENTS

| | | |
|---|---|---|
| JP | 2006-308320 A | 11/2006 |
| JP | 2008-3044 A | 1/2008 |
| JP | 2008-281438 A | 11/2008 |
| JP | 2009-31034 A | 2/2009 |
| WO | WO 2010/071657 A1 | 6/2010 |

OTHER PUBLICATIONS

International Search Report, issued in PCT/JP2014/082033, PCT/ISA/210, dated Mar. 3, 2015.
Written Opinion of the International Searching Authority, issued in PCT/JP2014/082033, PCT/ISA/237, dated Mar. 3, 2015.
Extended European Search Report issued in European Application No. 14884468.1 dated Sep. 13, 2017.

* cited by examiner (A)

(B)

METHOD FOR MEASURING TREAD RADIUS OF TIRE, AND DEVICE FOR MEASURING TREAD RADIUS USED THEREFOR

TECHNICAL FIELD

The present invention relates to a method for measuring a tread radius of a tire rotating around the tire axis, and a device for measuring a tread radius used therefor.

BACKGROUND ART

Although devices for measuring a tread radius of a tire are already present, conventional devices are limited to a static measurement of a part of the tire, and it was not possible to measure the tread radius over the entire circumference of the tire (for example, see Patent Documents 1 and 2).

One of characteristics required for a tire when installed on a vehicle is the steering stability. And it has been understood that the steering stability is highly correlated with the tread radius. The tread radius is subtly varied by the tire inflation at circumferential positions. Thus, it was impossible to get a grasp of the tread radius of a tire as a whole, and the tread radius could not be fully correlated with the steering stability.

In view of these circumstances, the present inventors proposed to determine the tread radius based on data when radial distances to the tread surface of a tire rotating around the tire axis are measured over the entire circumference of the tire by the use of three laser displacement meters. And it was ascertained that, according thereto, as the data include components of RRO (Radial Run Out) of the tire, a tread radius having a higher correlation with the steering stability can be obtained.

In order to obtain a tread radius from a rotating tire, however, it is necessary to consider the influence of transverse grooves in the tread surface, and novel measurement method and measurement device are required.

PRIOR ART DOCUMENTS

Patent Documents

Patent Document 1: Japanese Patent Application Publication No. 2006-153555
Patent Document 2: Japanese Patent Application Publication No. H03-226615

SUMMARY OF THE INVENTION

Problems that the Invention is to Solve

It is therefore, a problem of the present invention to provide a method for measuring a tread radius of a tire from a rotating tire and a device for measuring a tread radius used therefor in which the tread radius can be measured accurately.

Means for Solving the Problems

A first invention in this application is a method for measuring a tread radius for obtaining a tread radius of a tire using three laser displacement meters arranged in the tire axial direction at intervals, which is characterized in that a tread radius measuring process comprising a measuring step in which radial distances from the respective three laser displacement meters to the tread surface of the tire rotating around the tire axis are measured to obtain radial distance data sets y1, y2, y3 of the respective laser displacement meters wherein the data number in each set is m per the entire circumference of the tire, an averaging step in which a smoothing processing is performed on each set of the number m of the radial distance data y1, y2, y3, to remove noise data caused by lateral grooves, then the remaining radial distance data y1, y2, y3 are averaged to obtain an average value Y1$n$, Y2$n$, y3N, a calculating step in which the tread radius TR is calculated from each average value y1N, y2N, y3N, and a distance x1, x2, x3 in the tire axial direction from a reference position in the tire axial direction to each laser displacement meter, the width w of the laser beam of the laser displacement meter is more than 5 mm, the smoothing processing is such that, for each set of the number m of the obtained radial distance data y1, y2, y3, the i-th data $y_i$ in the time series of the obtaining is compared with a moving average yN which is the average of a number k of the last data previously obtained, and if the difference $|y_i - yN|$ is greater than a threshold, the data $y_i$ is removed as noise data.

A second invention in this application is a device for measuring a tread radius to determine the tread radius of a tire by the use of a laser displacement meter, which is characterized by having a tire holding device having a support shaft for supporting the tire rotatably around the tire axis, and
a laser measuring device having a laser displacement meter for measuring the radial distance to the tread surface of the tire,
wherein
the laser measuring device comprises
a movable table supported movably in the axial direction of the tire,
a central laser displacement meter supported by the movable table so as to be integrally movable therewith,
a middle laser displacement meter disposed on each side of the center laser displacement meter and supported so as to be movable in the axial direction of the tire relatively to the center laser displacement meter,
an outside laser displacement meter disposed on each side of the middle laser displacement meters and supported so as to be movable in the axial direction of the tire relatively to the center laser displacement meter and the middle laser displacement meters, and
a calculating means for calculating a tread radius TR based on data y1, y2, y3 about radial distances to the tread surface obtained by three of the five laser displacement meters, and distances x1, x2, x3 in the tire axial direction from a reference position in the tire axial direction to the three laser displacement meters,
wherein
the width w of the laser beam of each laser displacement meter is at least 5 mm, and
the optical axes of the laser displacement meters are arranged in a line in a radial plane extending from the tire axis.

Effect of the Invention

The method for measuring a tread radius of the present invention includes the measuring step, the calculating step and the averaging step.

In the measuring step, by using the three laser displacement meters, the radial distance data sets y1, y2, y3 wherein the data number of each set is m per the entire circumference of the tire for each laser displacement meter, are obtained.

In the measuring step, as the tire is rotating around the tire axis, the obtained radial distance data y1, y2, y3 include components of RRO of the tire.

Therefore, it is possible to obtain a tread radius which is highly correlate with the steering stability.

When radial distance data are obtained from a rotating tire, the data include noise data affected by sipes, notches, lateral grooves and the like formed in the tread surface, and thereby the accuracy is liable to reduce.

In this invention, therefore, a laser displacement meter whose laser beam width w is at least 5 mm is used. As a result, by a filtering function which the laser displacement meter itself has, unevenness of the tread surface (e.g. unevenness caused by sipes, notches and the like) existing locally in a portion irradiated by the laser beam can be removed, and it is possible to suppress the generation of noise data.

On the contrary, if the entire portion irradiated by the laser beam enters in the unevenness such as a transverse groove, noise data is generated. However, the noise data can be detected and removed through the smoothing process comparing the difference from the moving average with the threshold. Therefore, based on the remaining radial distance data y1, y2, y3 from which noise data have been removed by the filtering function of the laser displacement meter itself and the smoothing processing, a tread radius can be obtained with high accuracy.

MODE FOR CARRYING OUT THE INVENTION

Embodiments of the present invention will now be described in detail.

Figure 1:
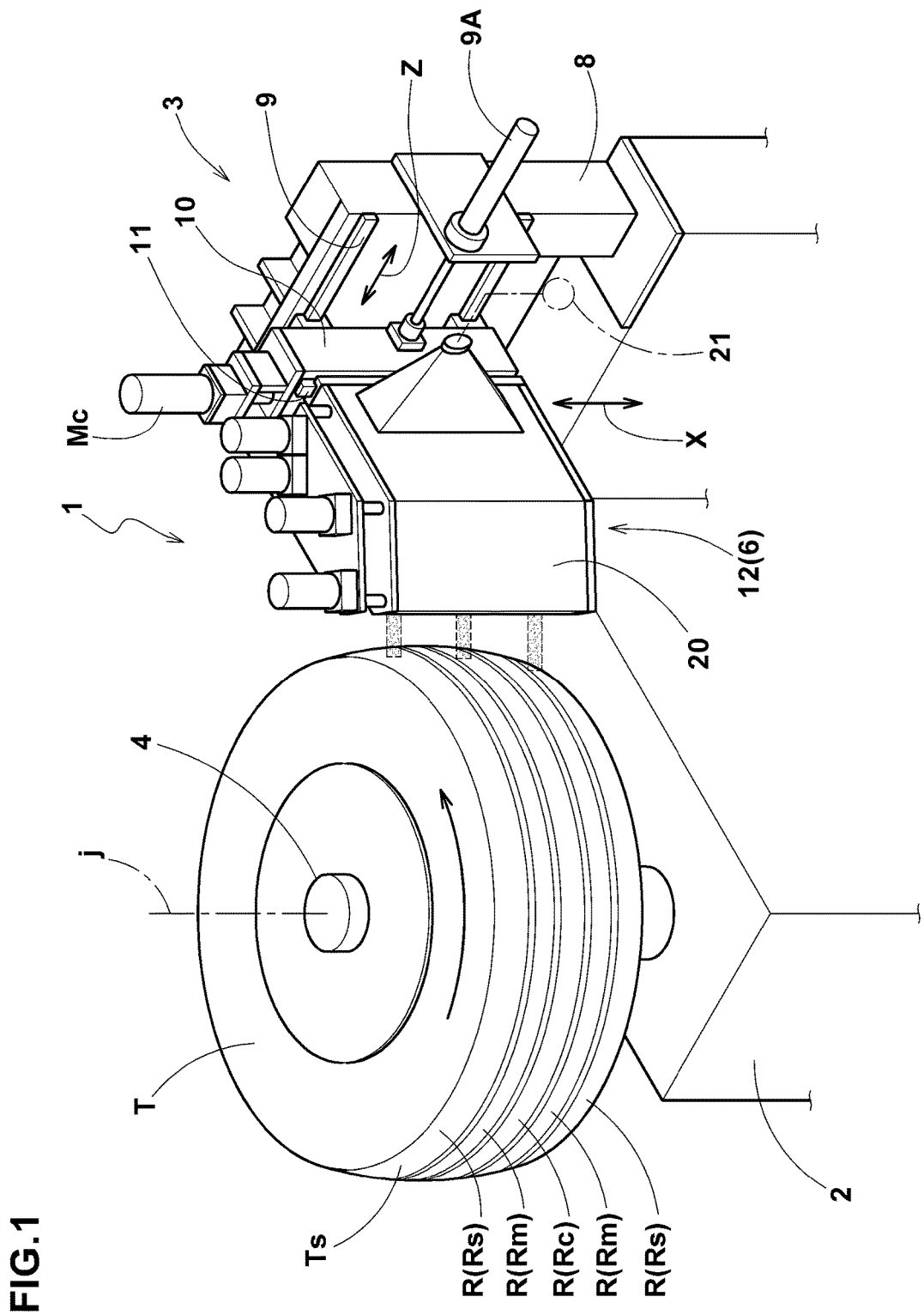
FIG. 1 A perspective view showing an embodiment of a device for measuring a tread radius used in a method for measuring a tread radius of the present invention.
Figure 2:
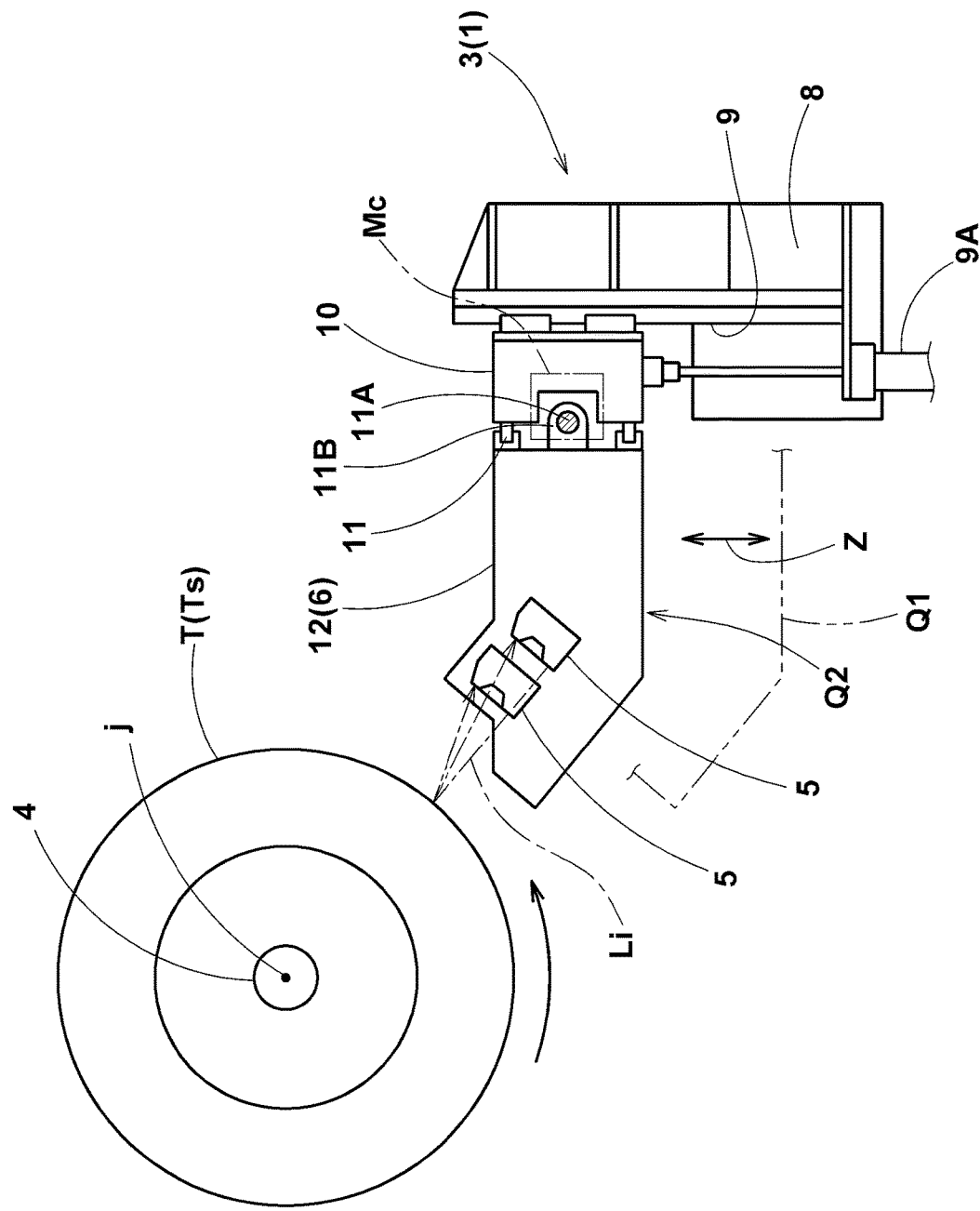
FIG. 2 A plan view of a main portion thereof viewed from the above.

As shown in FIGS. 1 and 2, a device for measuring a tread radius 1 for use in a method for measuring a tread radius of the present invention comprises a tire holding device 2, and a laser measuring device 3.

The tire holding device 2 has a support shaft 4 for supporting the inflated tire T rotatably around the axis j.

The laser measuring device 3 has at least three laser displacement meters 5 (shown in FIG. 4) for measuring radial distances to the tread surface Ts of the rotating tire T.

The tire holding device 2 in this example has
a support shaft 4 to horizontally support the tire T mounted on
a rim, and
a driving means (not shown) such as a motor for rotating the support shaft 4 at a predetermined rotational speed.

However, the support shaft 4 may be configured so as to support the tire T vertically.

As the driving means, a load wheel for driving the tire T by being directly pressed against the tread portion may be used. In this example, as the tire T, there is shown a passenger car tire of a rib pattern in which five circumferential ribs R extending in the tire circumferential direction are disposed in the tread surface Ts.

The circumferential ribs R are a center rib Rc on the center, middle ribs Rm and Rm on both sides thereof, and shoulder ribs Rs and Rs on the outer sides of them.

The laser measuring device 3 comprises a movable table 6, five laser displacement meter 5 in this example arranged on the movable table 6, and a computing means 7 (not shown) for calculating the tread radius TR based on radial distance data y measured by the laser displacement meters 5.

Specifically, the laser measuring device 3 in this example has a pedestal 8, a first movable carriage 10 which is supported by the pedestal 8 movably in a Z direction perpendicular to the tire axial direction X via a guide means 9, and a second movable carriage 12 which is supported by the first movable carriage 10 movably in the tire axial direction X via a guide means 11.

The second movable carriage 12 constitute the above-mentioned movable table 6.

As the guide means 9 and 11, those of various well known structures can be used. In this example, shown is that having a guide rail extending straight and a guide groove guided thereby as shown in FIG. 2.

The guide means 9 includes a cylinder 9A fixed to the pedestal 8 and extending in the Z-direction, and
its rod end is connected to the first movable carriage 10. Therefore, by the expansion and contraction of the cylinder 9A, the first movable carriage 10 is moved in the Z-direction between a standby position Q1 and a measurement position Q2. Further, the guide means 11 includes
a ball screw shaft 11A which is pivotally supported on the first movable carriage 10 to extend in the tire axial direction X, and
a nut portion 11B attached to the movable table 6 (second movable carriage 12 in this example) and screwed to the ball screw shaft 11A.

Therefore, the movable table 6 can be moved freely in the tire axial direction X by the rotation of the ball screw shaft 11A caused by the motor Mc.

Figure 3:
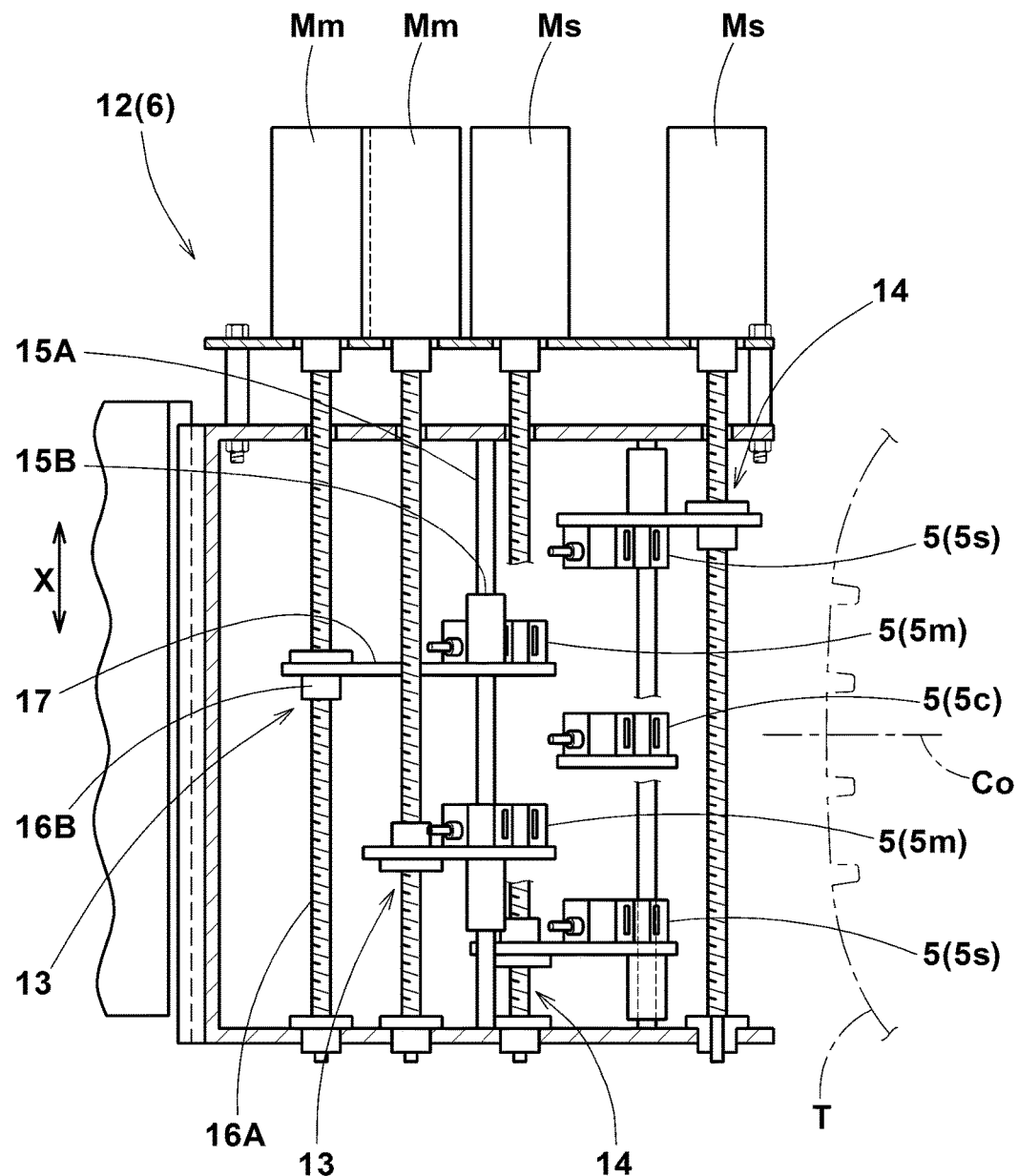
FIG. 3 A conceptual view of the internal structure of a laser measuring device viewed from the side.

As shown in FIG. 3, the five laser displacement meters 5 are arranged in the tire axial direction X to have a certain distance from each other. In this example, they are a central laser displacement meter 5c, middle laser displacement meters 5m, 5m arranged on both sides thereof, and outside laser displacement meters 5s, 5s further disposed on both sides thereof.

The center laser displacement meter 5c is fixed to the movable table 6, thus, movably in the tire axial direction X together with the movable table 6.

Each of the middle laser displacement meters 5m, 5m is supported by the movable table 6 movably in the tire axial direction X via a guide means 13. In other words, the middle laser displacement meters 5m are movable in the tire axial direction X relatively to the center laser displacement meter 5c.

Further, each of the outer laser displacement meters 5s, 5s is supported by the movable table 6 movably in the tire axial direction X via a guide means 14. In other words, each of the outside laser displacement meters 5s is movable in the tire axial direction X relatively to the center laser displacement meters 5c and the middle laser displacement meters 5m.

Therefore, by the movement of the movable table 6 itself by the guide means 11, it is possible to align the center laser displacement meter 5c to a reference position on the tire equator Co for example.

By the guide means 13 and 14, it is possible to move each of the middle laser displacement meters 5m and the outside laser displacement meters 5s to an appropriate measurement position based on the center laser displacement meter 5c depending on the tire size and tread pattern, In the measurement position Q2, as shown in FIG. 2, all of the laser displacement meters 5 are arranged so that their optical axes Li of irradiating light are arranged in a line in a radial plane extending from the tire axis j.

As to the guide means 13 and 14, those having well known various structures may be used.

As shown in FIG. 3, the structure in this example comprises
a guide shaft 15A and a ball screw shaft 16A bridged between side plates of the movable table 6, and
a guide hole 15B guided by the guide shaft 15A and
a nut portion 16B screwed to the ball screw shaft 16A, attached to the laser displacement meter mounting plate 17.

Therefore, by the rotation of the ball screw shaft 16A by a motor Mm, Ms, the middle laser displacement meter 5m and the outside laser displacement meter 5s can be moved in the tire axial direction X freely and independently of each other.

Figure 5:
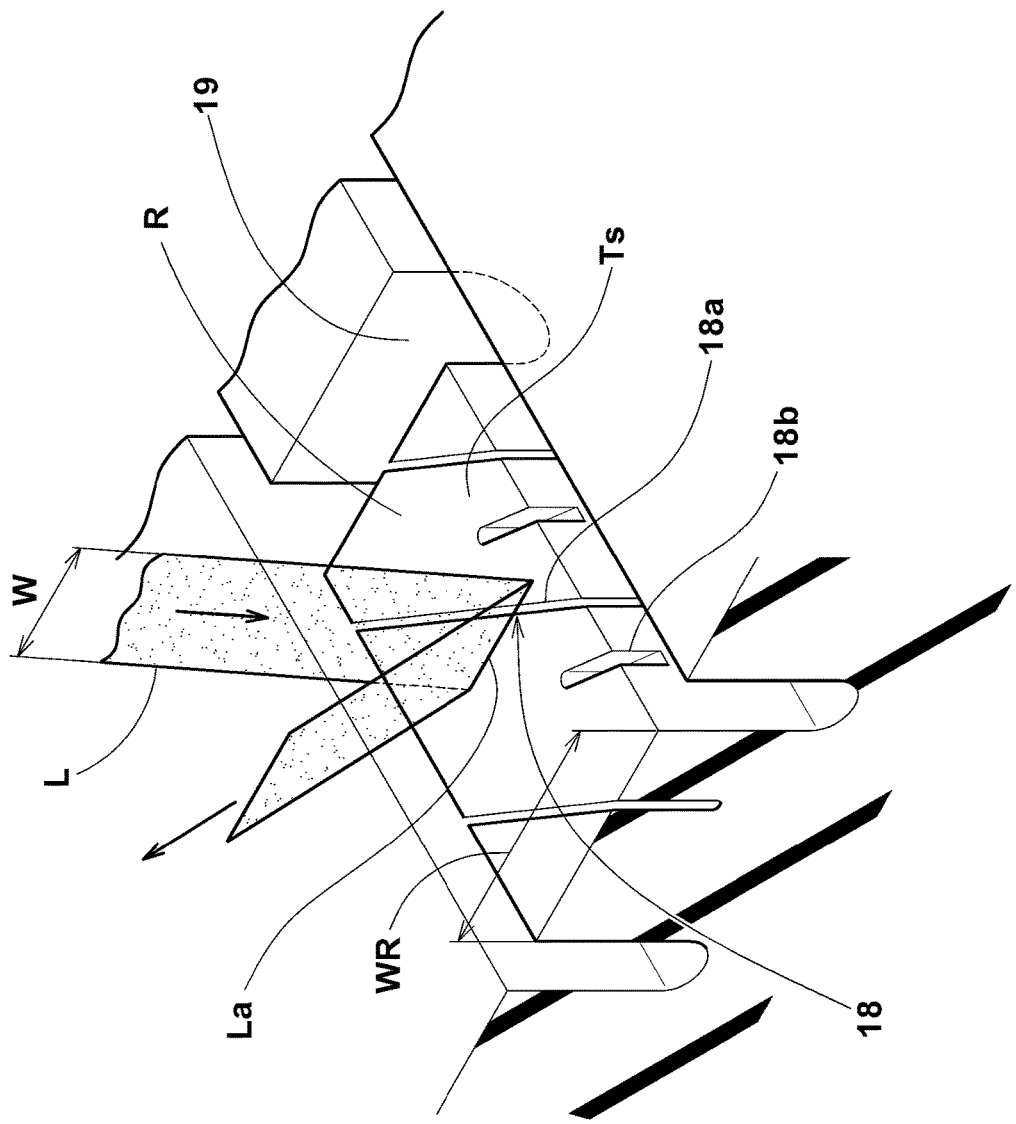
FIG. 5 A partial perspective view for explaining the effect of a wide laser beam.

The laser displacement meter 5 whose laser beam L has a width W of not less than 5 mm as shown in FIG. 5, is employed. In such laser displacement meter 5, unevenness 18 of the tread surface Ts (unevenness due to, for example, sipes 18a and notch 18b, etc.) existing locally in the portion La irradiated by the laser beam L is removed by the filtering function that the laser displacement meter 5 itself has.

Therefore, there is an advantage such that the generation of noise data due to the local unevenness 18 can be suppressed. On the contrary, when the entire portion La irradiated by the laser beam falls within the unevenness such as a lateral groove 19, noise data is generated.

This noise data is however, detected in the smoothing processing by the computing means 7 and removed.

The computing means 7 will be described in the method for measuring a tread radius using the device 1 for measuring a tread radius.

The laser displacement meter 5 has a tendency such that the measured value is varied according to the ambient temperature change. The reason therefor is considered as due to a change in the shape of a holder portion cause by the ambient temperature changes, wherein the holder portion is used for the light-receiving portion of the sensor and made of a plastic. In general, a laser displacement meter 5 has a temperature dependence of 0.05%/1 degree C. For example, if the temperature is changed from 2 degrees C. (temperature in a factory in winter) to 40 degrees C. (temperature in the factory in summer), the measured value is varied by 9.5 mm when the distance to the tread surface Ts is 500 mm.

Figure 4:
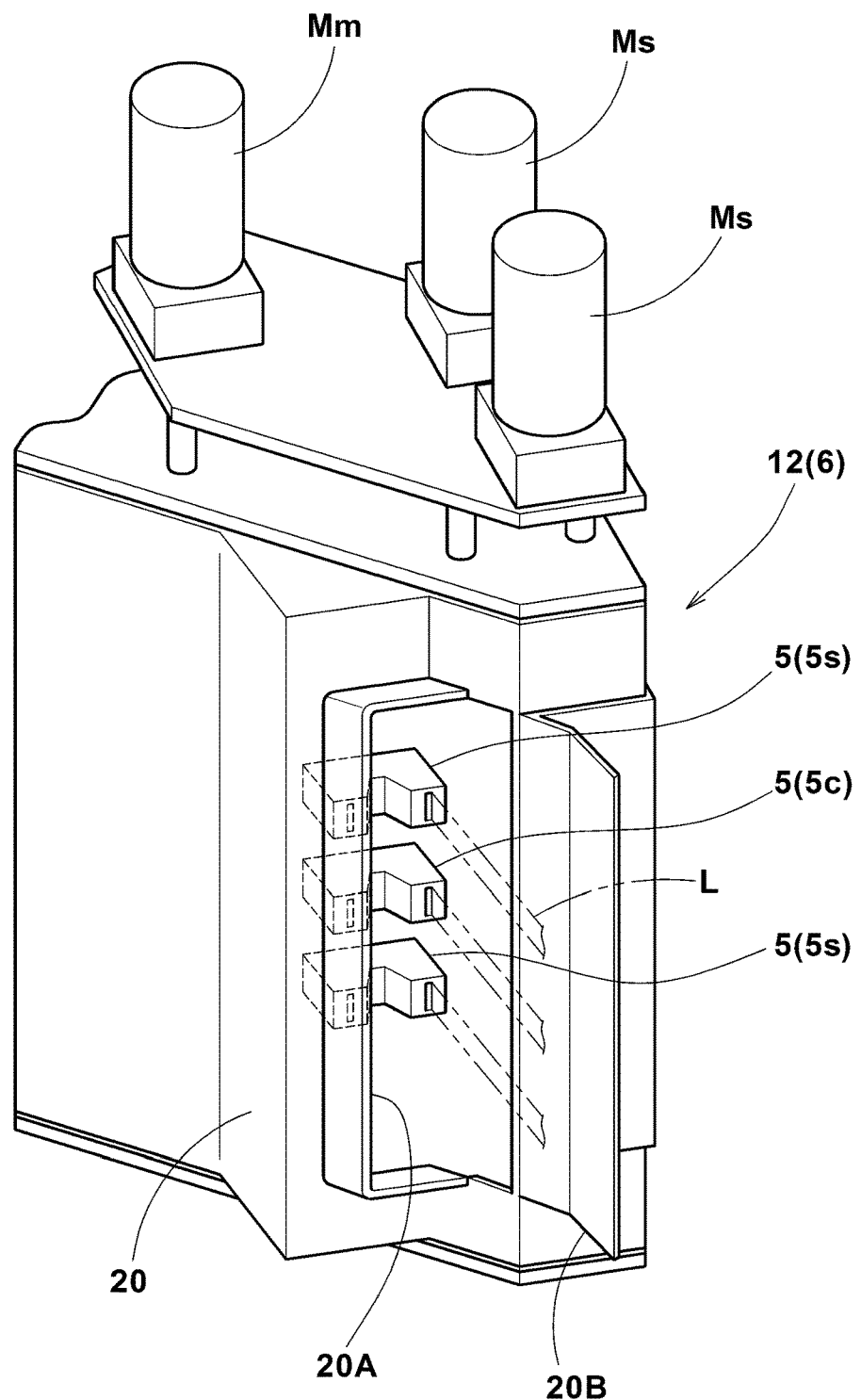
FIG. 4 A perspective view showing a main portion of the laser measuring device.

Therefore, in order to suppress the variations of the measured values, as shown in FIGS. 1 and 4, the laser measuring device 3 in this example has a surrounding wall 20 encompassing the five laser displacement meters 5, and a temperature controller 21 for controlling the temperature of the interior of the surrounding wall 20. In this example, the surrounding wall 20 encompasses the entire movable table 6. The surrounding wall 20 is provided with an opening 20A through which a laser beam of each laser displacement meter 5 passes. The opening 20A can be opened and closed by a lid 20B. Therefore, the opening 20A is opened when the laser displacement meters 5 are irradiating, and the opening 20A is closed after irradiating to stably control the internal temperature. As the temperature controller 21, well-known ones, for example, a spot air conditioner can be used.

The method for measuring a tread radius of the present invention comprises a tread radius measuring process SA including a measuring step, an averaging step, and a calculating step.

Figure 6:
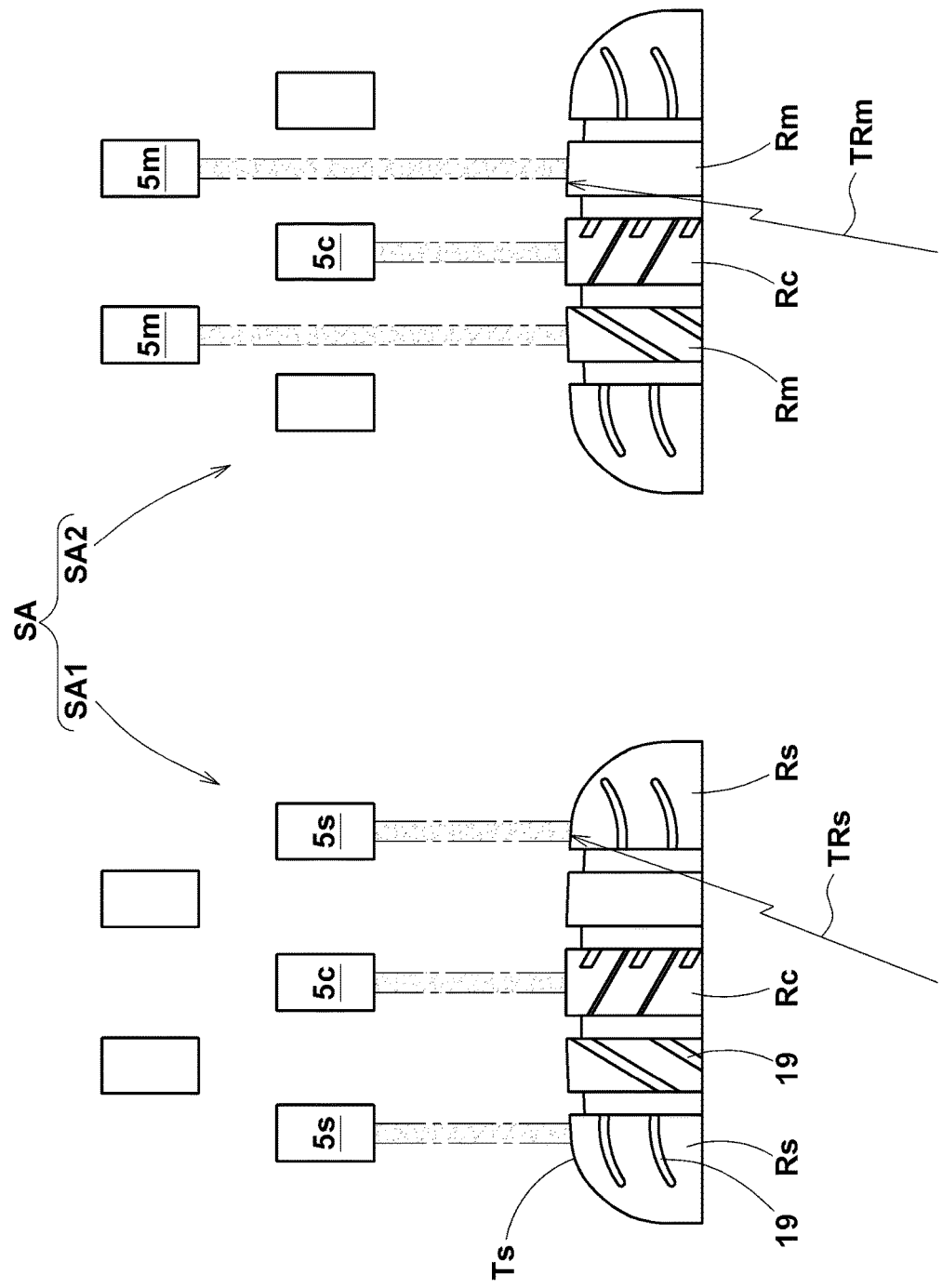
FIG. 6 A conceptual view showing a step of calculating a first tread radius TRs, and a step of calculating a second tread radius TRm.

In this example, as shown in FIG. 6, the tread radius measuring process SA includes
a step SA1 of calculating a first tread radius TRs from three ribs of the five circumferential ribs R which are the center rib Rc and the shoulder ribs Rs, Rs, and
a step SA2 of calculating a second tread radius TRm from three ribs which are the center rib Rc and the middle ribs Rm and Rm. The reason to measure the first and second tread radii TRs, TRm is that the correlation with the steering stability is changed by the conditions of use of the tire, for example,
in the conditions of use in a country A, the correlation between the steering stability and the first tread radius TRs is strong, but in the conditions of use in another country B, the correlation between the steering stability and the second tread radius TRm is strong. Thus, by measuring the two tread radii TRs and TRm, it becomes possible to evaluate the steering stability more precisely.

As a representative example, the step SA1 of calculating the first tread radius TRs will now be explained.

In the measuring step, the radial distances from three of the five laser displacement meters 5 to the tread surface Ts of the tire T rotating around the tire axis are measured to obtain the radial distance data sets y1, y2, y3 of the respective laser displacement meters 5 wherein the data number of each set is m per the entire circumference of the tire.

In the step SA1, with the center laser displacement meter 5c, the data y1 about the radial distance to the center rib Rc whose data number is m per the entire circumference of the tire are obtained. In other words, radial distance data y11 to y1m whose data number is m, are obtained.

Further, with the respective outside laser displacement meters 5s and 5s, the data y2 and y3 about the radial distances to the respective shoulder ribs Rs, Rs, whose data number is m per the entire circumference of the tire are obtained.

In other words, radial distance data $y2_1$ to $y2_m$ whose data number is m, and radial distance data $y3_1$ to $y3_m$ whose data number is m, are obtained.

In the averaging step, for each radial distance data set y1, y2, y3, the number m of the radial distance data are subjected to a smoothing processing to remove noise data due to the lateral grooves 19.

Further, after removal of the noise data, the radial distance data y1, y2, y3 are averages to obtain the respective average value y1N, y2N, y3N.

The smoothing processing is performed on each radial distance data set y1, y2, y3, and with respect to the number m of the obtained radial distance data, the i-th data $y_i$ in the time series of the obtaining is compared with the moving average yN of a number k of the previously obtained data nearest thereto in the time series. And, if the difference $|y_i-yN|$ is larger than a threshold value, the data $y_i$ is considered as a noise data and removed from the radial distance data y1, y2, y3.

Specifically, the number k of the last data obtained previously to the i-th data $y_i$ means $y_{i-1}$ to $y_{i-k}$.

The moving average yN of the number k of the last data is $(y_{i-1}+y_{i-2}+ - - - +y_{i-k})/k$.

In the case of the radial distance data set y1, the i-th data $y_i$ is $y1_i$, and the number k of the last data $y_{i-1}$ to $y_{i-k}$ are $y1_{i-1}$ to $y1_{i-k}$.

The moving average yN is $(y1_{i-1}+y1_{i-2}+ - - - +y1_{i-k})/k$.

The same applies to the radial distance data sets y2, y3.

The difference $|y_i-yN|$ between the moving average yN and the data $y_i$ is compared with the threshold, and if the difference $|y_i-yN|$ is greater than the threshold, then the data $y_i$ is removed as noise data.

This operation is continued from i=1 to i=m in sequence. when k≥i, as the number k of the last data, $y_{i-1}$, $y_{i-2}$, - - - $y_1$, $y_m$, $y_{m-1}$, - - - $y_{m-(k-i)}$ are used.

Here, selected as the threshold is a value larger than envisaged RR0 and smaller than the depth of the lateral grooves 19 arranged in the circumferential rib R. Usually, about 3.0 mm is selected.

In the tread radius measuring process, the tread radius TR is calculated from the average values y1N, y2N and y3N, and the tire axial distances x1, x2, x3 of the laser displacement meters 5 from a reference position X in the tire axial direction (which can be arbitrarily determined).

Specifically, the tread radius which is a radius of curvature TR can be obtained by assigning three points P (x1, y1N), P (x2, y2N), P (x3, y3N) to the following formula (1)

$$(x-a)^2+(y-b)^2=TR^2 \quad (1)$$

And the smoothing processing of such radial distance data sets y1, y2, y3, the calculation of the average values y1N, y2N, y3N, and the calculation of the tread radius TR from the average values y1N, y2N, y3N and the distances x1, x2, x3 are performed by the computing means 7.

The step SA2 of calculating the second tread radius TRm is also similar.

Incidentally, the step SA1 and the step SA2 can be performed simultaneously. In that case, the radial distance data set y1 obtained by the center laser displacement meter 5c, and the average value y1N obtained from the radial distance data set y1 through the smoothing process can be used commonly.

The number m of the obtained radial distance data is preferably at least 500. If less than this value, the correlation between the tread radius and the steering stability tends to decrease. Although, the upper limit of the number m is not specifically limited, if too large, the process is complicated which leads to a waste of time. Therefore, the upper limit of the number m is preferably 2000 or less.

The number k of the moving averages is preferably from 2 to 100. Even if the number k exceeds 100, the accuracy in the smoothing process can not be expected to increase, and the process becomes complicated which leads to a waste of time. Further, in order to improve the accuracy of the smoothing process, it is preferred that the rotational speed of the tire T is set in a range of 20 to 3000 rpm. If less than 20 rpm, the accuracy is lowered. If it exceeds 3000 rpm, it is difficult to obtain the radial distance data whose data number is 500 or more per the entire circumference.

Further, in order to improve the filtering accuracy of the laser displacement meter 5, as shown in FIG. 5, the width w of the laser beam L is preferably set in a range of 10% to 70% of the rib width WR of the circumferential rib R to be measured. If the width w of the laser beam L is Less than 5 mm or less than 10% of the rib width WR, the proportion of such sipes 18a and notches 18b occupying the irradiated portion La to the irradiated portion La is increased, and the filtering function is not sufficiently exerted.

If more than 70%, there is a possibility that the laser beam L protrude from the circumferential rib R.

In the method for measuring a tread radius of the present invention, as the three laser displacement meters 5 are used simultaneously, high accuracy is required for the laser displacement meters 5. So the method for measuring a tread radius comprises a step of calibrating the laser displacement meters to be performed prior to the tread radius measuring process.

Figure 7:
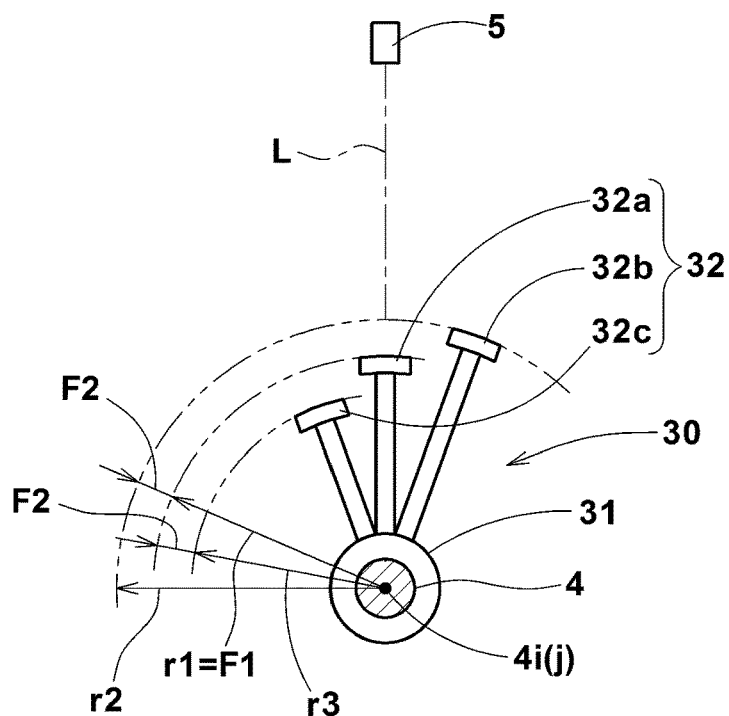
FIG. 7 (A), (B) are conceptual diagrams for explaining a calibrating step.
Figure 7:
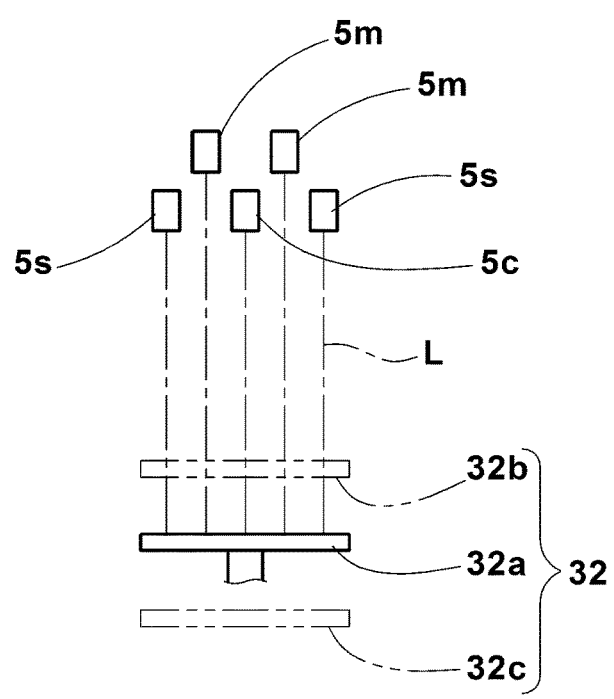

In the calibrating step, as conceptually shown in FIG. 7, a calibration jig 30 is used. The calibration jig 30 has a cylindrical base portion 31 supported by the support shaft 4, and reflection plates 32 attached integrally to the base portion 31. The reflection plates 32 include a first reflection plate 32a spaced apart from the axis 4i of the support shaft 4 (corresponding to the tire axis j) by a distance F1 in the radial direction, and second and third reflection plates 32b and 32c spaced apart from the first reflection plate 32a by a distance F2 radially inwardly and outwardly.

The reflection plates 32a, 32b, 32c are arranged in the circumferential direction to be spaced apart from each other.

In the calibrating step, firstly origin adjustment is performed for each laser displacement meter 5 by using the first reflection plate 32a.

Then, by using the second and third reflection plates 32b and 32c, gain adjustment is performed for each laser displacement meter 5.

It is preferable that the reflecting surfaces of the first to third reflection plates 32a, 32b, 32c are formed by convex cylindrical surfaces having radii r1, r2, r3 of curvature equal to the respective distances from the axis 4i.

That is, r1=F1, r2=F1+F2, r3=F1−F2.

Thereby, when the reflection plates 32a, 32b, 32c are repositioned around the axis 4i, even if the reflection plate 32a, 32b, 32c are slightly shifted angularly, it is possible to accurately reflect the laser beam L to speed up the calibrating step.

While detailed description has been made of an especially preferable embodiment of the present invention, the present invention can be embodied in various forms without being limited to the illustrated embodiment.

WORKING EXAMPLES

According to the measuring method of the present invention, ten pneumatic tires (195/65R15) were measured for the tread radius TRs by the use of the measuring device shown in FIG. 1, based on the specifications shown in Table 1.

The tread pattern was a five-rib pattern, and

The rib width WR was 20-->25 mm.

For comparison, measurement was made by fitting a radius gauge onto the tread surface at ten positions on the circumference, and the measured values are averaged and listed as Comparative Example 1.

TABLE 1

|  | comparative example 1 | working example 1 | working example 2 | working example 3 | working example 4 | working example 5 | working example 6 | comparative example 2 | comparative example 3 |
|---|---|---|---|---|---|---|---|---|---|
| laser beam width W (*1) | — | 20% | 50% | 20% | 20% | 20% | 20% | no width | 20% |
| number m of obtained data | — | 1024 | 1024 | 1024 | 1024 | 1024 | 1024 | 1024 | 1024 |
| smoothing process | — | yes | yes | yes | yes | yes | yes | yes | no |
| number k of moving averages | — | 20 | 20 | 4 | 100 | 20 | 20 | 20 | 20 |
| tire rotational speed (rpm) | — | 300 | 300 | 300 | 300 | 1000 | 300 | 300 | 300 |
| temperature control for laser displacement meters | — | no | no | no | no | no | yes | no | no |
| radius TR | 750 | 750 | 750 | 750 | 750 | 750 | 750 | 750 | immeasurable |
| standard deviation σ | 50 | 25 | 30 | 45 | 30 | 30 | 15 | 80 | — |

*1) the ratio W/WR of the leaser beam width W to the rib width WR is shown.

As shown in the table, it can be confirmed that, in the working examples, the standard deviations are small, and the variations of the measured values are small.

DESCRIPTION OF THE REFERENCE NUMBERS 1 device for measuring a tread radius
2 tire holding device
3 laser measuring device
4 support shaft
5 laser displacement meter
6 movable table
7 computing means
20 surrounding wall
21 temperature controller
30 calibration jig
31 base portion
32a first reflection plate
32b second reflection plate
32c third reflection plate
j tire axis
L laser beam
Li optical axis
R circumferential rib
Rc center rib
Rs shoulder rib
Rm middle rib
T tire
TR tread radius
Ts tread surface
X tire axial direction

The invention claimed is:

1. A method for obtaining a tread radius of a tire using three laser displacement meters arranged in the tire axial direction at intervals, which comprises:
   a tread radius measuring process comprising
      a measuring step in which radial distances from the respective three laser displacement meters to the tread surface of the tire rotating around the tire axis are measured to obtain radial distance data sets y1, y2, y3 of the respective laser displacement meters wherein the data number of each set is m per the entire circumference of the tire,
      an averaging step in which a smoothing processing is performed on the number m of the radial distance data of each set y1, y2, y3, to remove noise data caused by lateral grooves, then an average value y1N, y2N, y3N, is obtained by averaging the remaining radial distance data of each set y1, y2, y3, and
      a calculating step in which the tread radius TR is calculated from each average value y1N, y2N, y3N, and a distance x1, x2, x3 in the tire axial direction from a reference position in the tire axial direction to each laser displacement meter,
   wherein
      the width W of the laser beam of the laser displacement meter is more than 5 mm, and
      the smoothing processing is such that, for each set of the number m of the obtained radial distance data y1, y2, y3, the i-th data $y_i$ in the time series of the obtaining is compared with a moving average yN which is the average of a number k of the last data previously obtained, and if the difference $|y_i-yN|$ is greater than a threshold, the data $y_i$ is removed as noise data.

2. The method for measuring a tread radius as set forth in claim 1, wherein the number m of the obtained radial distance data is at least 500.

3. The method for measuring a tread radius as set forth in claim 1, wherein the rotational speed of the tire is 20 to 3000 rpm.

4. The method for measuring a tread radius of a tire according to claim 1, wherein the number k of the moving averages is 2 to 100.

5. The method for measuring a tread radius of a tire according to claim 1, wherein
   the tread surface comprises at least three circumferential ribs extending in the tire circumferential direction,
   the laser displacement meters measure the radial distances to the surfaces of the three circumferential ribs which are selected from the circumferential ribs, and
   the width W of the laser beam is in a range of 10 to 70% of the rib width.

6. The method for measuring a tread radius of a tire according to claim 1, wherein
   the tread surface comprises five circumferential ribs extending in the tire circumferential direction, and
   the tread radius measuring process comprises
      a step of calculating a first tread radius TRs from the three circumferential ribs which are a center rib being center of the five circumferential ribs, and the outermost shoulder ribs, and
      a step of calculating a second tread radius TRm from three circumferential ribs which are the center rib being center of the five circumferential ribs, and middle ribs on both sides thereof.

7. The method for measuring a tread radius of a tire according to claim 1, wherein
   prior to the tread radius measuring process a calibrating step of calibrating the laser displacement meters is conducted,
   the calibrating step utilizes a calibration jig in which a base portion is integrally provided with a first reflection plate, a second reflection plate and a third reflection plate at intervals in the circumferential direction, the base portion is supported by a support shaft for the tire, the first reflection plate is spaced apart from the axis of the support shaft by a distance F1 in a radial direction, the second and third reflection plates are spaced apart from the first reflection plate outwardly and inwardly by a distance F2 in a radial direction, an origin adjustment is performed for each laser displacement meter by the use of the first reflection plate, and a gain adjustment is performed for each laser displacement meter by the use of the second and third reflection plates.

8. The method for measuring a tread radius as set forth in claim 7, wherein the first to third reflecting plates have reflecting surfaces formed by convex cylindrical surfaces having radii r1, r2, r3 of curvature equal to the distances from the axis, respectively.

9. The method for measuring a tread radius of a tire according to claim 1, wherein the laser displacement meters are surrounded by a surrounding wall, and the inside of the surrounding wall is temperature-controlled by a temperature controller to suppress variations of output of the laser displacement meters due to variations of temperature.

* * * * *